United States Patent [19]

Mole

[11] Patent Number: 4,773,826
[45] Date of Patent: Sep. 27, 1988

[54] PUMP

[75] Inventor: Cecil J. Mole, Monroeville, Pa.

[73] Assignee: Westinghouse Electric Corp., Pittsburgh, Pa.

[21] Appl. No.: 347,754

[22] Filed: Feb. 10, 1982

[51] Int. Cl.⁴ ............................................. H02K 44/00
[52] U.S. Cl. ...................................... 417/50; 376/402
[58] Field of Search ........................... 417/50; 510/10; 376/315, 395, 402, 403, 404

[56] References Cited

U.S. PATENT DOCUMENTS

| | | | |
|---|---|---|---|
| 2,715,190 | 8/1955 | Brill | 417/50 |
| 2,770,196 | 11/1956 | Watt . | |
| 3,219,851 | 11/1965 | Kidwell | 417/50 |
| 3,567,339 | 3/1971 | Paine | 417/50 |
| 4,314,171 | 2/1982 | Hatch | 310/178 |

FOREIGN PATENT DOCUMENTS

| | | | |
|---|---|---|---|
| 2112791 | 6/1972 | France . | |
| 0035404 | 3/1979 | Japan | 417/50 |
| 2070148 | 9/1981 | United Kingdom . | |

OTHER PUBLICATIONS

Yevick, John G. et al., *Fast Reactor Technology*, M.I.T. Press, 1966, pp. 175-185.
*Super Copper*, Phelps Dodge, New York, N.Y.

*Primary Examiner*—Deborah L. Kyle
*Assistant Examiner*—Richard W. Wendtland

[57] ABSTRACT

A DC electromagnetic pump for circulating liquid-metal coolant through a nuclear reactor. The metal is circulated through ducts which are disposed in an annulus. Opposite walls of the ducts serve as electrodes to transmit current radially with respect to the annulus through the liquid metal in the ducts. The radial current is supplied by a homopolar generator. The walls of the ducts joining the electrodes are of composite structure. They include metal plates insulated from the electrodes backed up by insulators and are capable of withstanding the pressure of the liquid metal. These composite wall structures may also be of thin metal strips of low electrical conductivity backed up by sturdy insulators. A circumferential electric field is supplied to the liquid metal by a toroidal electromagnet which has core sections interposed between the ducts. The windings of the electromagnet extend over the ducts to suppress flux leakage. The windings are composed of metal which is superconductive at low temperatures and the electromagnet is maintained at a temperature at which it is superconductive. The liquid helium for maintaining the windings at superconductive temperature is fed through the conductor which supply the excitation for the electromagnet.

14 Claims, 9 Drawing Sheets

PUMP

BACKGROUND OF THE INVENTION

The invention relates to pumps and has particular relationship to pumps for driving or transmitting liquid metal. Typically the pumps with which this invention concerns itself serve to circulate liquid metal coolant through a nuclear reactor. The liquid may be sodium at a temperature at the cool leg of the metal circuit of about 400° C. It is contemplated that two pumps are provided, a primary pump within the reactor vessel and a secondary pump outside of the reactor vessel where the temperature is high. Typically the liquid is supplied by a pump at the rate of 120,000 gallons per minute. The pumps constitute a major physical and economic factor in a power plant including a nuclear reactor.

In accordance with the teachings of the prior art, the liquid is circulated by centrifugal pumps. AC induction (electromagnetic) pumps have also been proposed for this purpose. Centrifugal and AC induction pumps are excessively large and costly and AC induction pumps are inefficient in use.

An alternative to the centrifugal and AC induction pumps is the DC electromagnetic pump. Typically the liquid is advanced by the interaction of direct current flowing through the liquid with a constant magnetic field at right angles to the direction of the direct current and the flow of the liquid. In the past, low efficiencies, between 20% and 40%, have been experienced in the use of the DC electromagnetic pumps and their use has been limited. Induction pumps may achieve an efficiency of about 40%. Conventional mechanical (centrifugal) pumps may achieve an efficiency as high as 70% but these pumps are not as reliable as the electromagnetic pumps.

The liquid metal in a DC electromagnetic pump is conducted through a duct. The electrodes through which the current is supplied to the metal constitute spaced walls of the duct. If the wall sections interconnecting the electrodes are of material having substantial electrical conductivity, the shunt current which flows through the wall sections contributes materially to the inefficiency of the DC electromagnetic pump. It has been proposed that the interconnecting wall sections be made of electrically insulating material. (See Kidwell U.S. Pat. No. 3,219,851) However the pressure of the liquid within the ducts is very high, at least 100 pounds per square inch. To withstand the pressure, the insulating material must have good high strength properties and resist corrosion and erosion. A typical material which meets those requirements is high density aluminum oxide, which can only be used structurally in compression.

The current which is conducted through the liquid is very high; typically 500,000 to 1,000,000 amperes. The losses in the generator which supply the current are another important factor contributing to inefficiency. A further contributing factor is the loss in the electromagnet which impresses the field.

It is accordingly an object of this invention to overcome the disadvantages and drawbacks of the prior art and to provide a direct current electromagnetic pump for transmitting a driving liquid metal which shall operate efficiently. It is also an object of this invention to provide such an electromagnetic pump in whose operation the losses resulting from the supply of current to the liquid metal and the losses in the electromagnet shall be minimized.

SUMMARY OF THE INVENTION

In accordance with this invention there is provided an efficient DC electromagnetic pump for transmitting an electrically conducting liquid. The liquid is transmitted through ducts whose inner walls include spaced electrodes for transmitting current through the liquid transversely of the direction of flow of the liquid. The electrodes are interconnected by walls of composite structure which are capable of withstanding the pressure of the liquid metal and are insulated from the electrodes. The electrodes may also be interconnected by thin inner metal wall sections of low electrical conductivity, which may be structured to present elongated paths of high electrical resistance to the flow of current so the wall sections can withstand the high pressure of the liquid, these metal wall sections are backed up by sturdy wall structures electrically insulated from the electrodes. High current is supplied to the conducting liquid from a homopolar generator or solid-state power supply. Typically the Westinghouse SEGMAG generator can be used for this purpose. Typically there are a plurality of ducts spaced in an annulus and flaring at their ends into liquid metal inlet and outlet terminals. The electromaget is a toroid whose magnetizable blocks or cores are interposed between the separate ducts. The excitation windings of the electromagnet are maintained superconductive and have saddleback winding shapes at the ducts to allow duct penetration without significant flux leakage.

Some of the features embodied in electromagnetic pumps according to this invention are capable of being used with advantage in electromagnetic pumps whose electromagnet is operated at temperatures out of the superconductive range. To the extent that any feature of this invention has such capability, the corresponding use is within the scope of equivalents of this invention.

BRIEF DESCRIPTION OF THE DRAWINGS

For a better understanding of this invention, both as to its organization and as to its method of operation, together with additional objects and advantages of this invention, reference is made to the following description, taken in connection with the accompanying drawings, in which.

DETAIL DESCRIPTION OF EMBODIMENTS OF INVENTION

Figure 1:
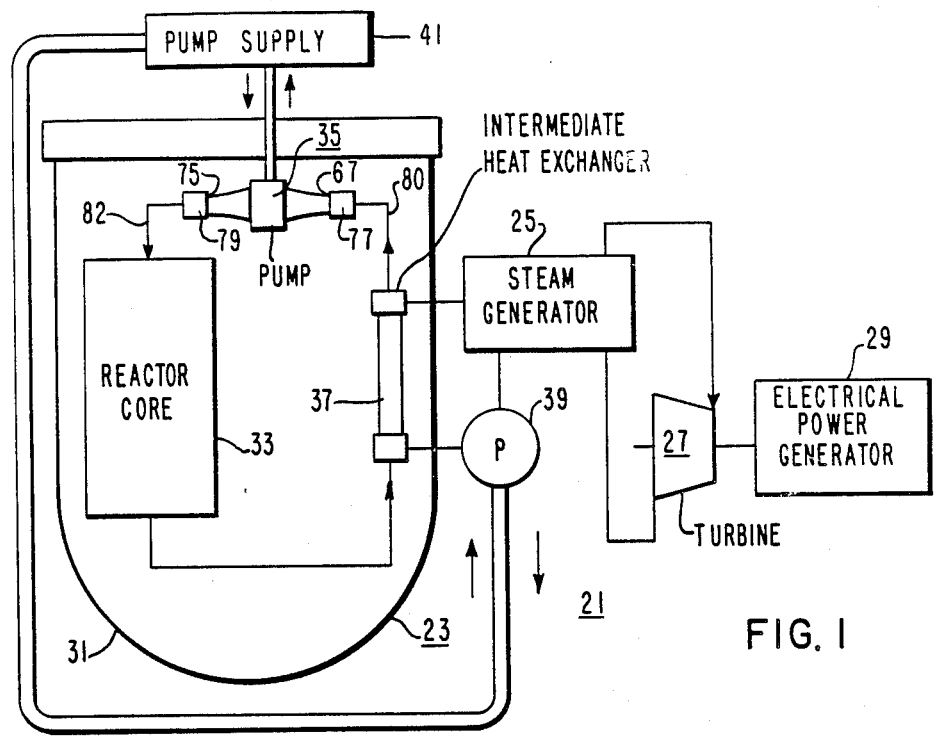
FIG. 1 is a schematic showing a nuclear reactor power plant in which DC electromagnetic pumps in accordance with this invention are included.

The apparatus shown in FIG. 1 is a nuclear reactor plant 21. FIG. 1 shows only the principal components of such a plant. This showing is sufficient for an understanding of this invention.

The plant 21 incudes a nuclear reactor 23, and energy-conversion units including a steam generator 25, a turbine 27 and an electrical power generator 29. In the typical plant in which this invention is used, a plurality of energy-conversion units are supplied from a nuclear reactor.

The nuclear reactor 23 is typically of the type in which the core coolant is liquid metal; typically liquid sodium. The reactor includes a gas-tight sealed vessel 31 within which there are a reactor core 33, a DC electromagnetic pump 35 in accordance with this invention and a heat exchanger 37 which is commonly referred to as an intermediate heat exchanger. This heat exchanger serves to isolate the liquid metal within the vessel 31 from water which may leak from the steam generator 25. The reactor vessel 31 may include mounting struts 36 (FIG. 2) for mounting the pump 35 vertically. The pump 35 pumps the liquid metal coolant through the core where it is heated. The coolant then flows through the heat exchanger 37 and back to the inlet of the pump. The secondary fluid of the heat exchanger 37 is also liquid metal. This liquid is pumped by a second pump 39 through the primary tubes (not shown) of the steam generator 25. The secondary fluid of the generator 25 is steam. The steam is circulated between the turbine 27 and generator 25. The turbine 27 drives the electrical power generator 29. The pump 39 is also a DC electromagnetic pump. A pump supply 41 is provided for supplying the pumps 35 and 39 with the necessary helium and electrical power.

Figure 15:
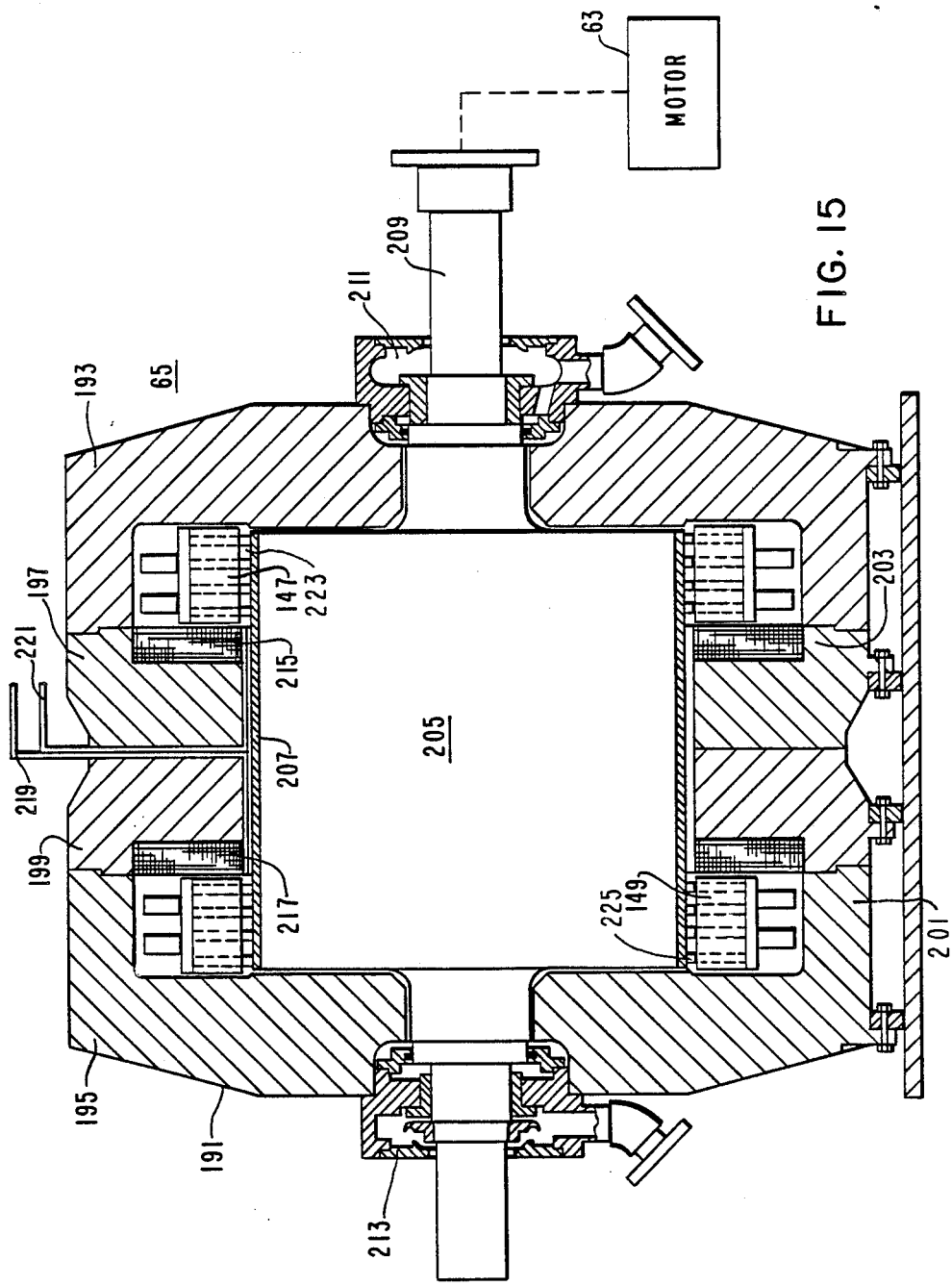
FIG. 15 is a view in longitudinal section of the homopolar generator which supplies the transverse current to the liquid which is pumped in the practice of this invention.

The pump supply 41 (FIG. 2) includes a compressor 43, a refrigerator 45, an excitation system 47 and motor-generator set 49 (FIG. 15). The compressor 43 and refrigerator 45 cooperate to supply liquid helium to cool the windings 51 (FIGS. 4, 5, 8, 9) of the electromagnet 53 of the pump 35 to superconductive temperature. The liquid helium is supplied through a coaxial cable 55 (FIGS. 11, 12) within which are the electrical conductors 57 and 59 which carry the excitation current for the windings 51. The helium gas is returned to the refrigerator 45 through conductor 61 (FIG. 13). The motor generator set 49 includes motor 63 which drives homopolar generator cooled by water or other medium 65. The generator 65 supplies high current at a low voltage to the liquid metal in the pump 35.

Typically the pump 35 circulates about 120,000 gallons per minute of sodium through the reactor core 33. The homopolar generator 65 typically operates at a voltage of 10 or 20 volts and supplies about 500,000 to 1,000,000 amperes to the liquid metal coolant.

Figure 2:
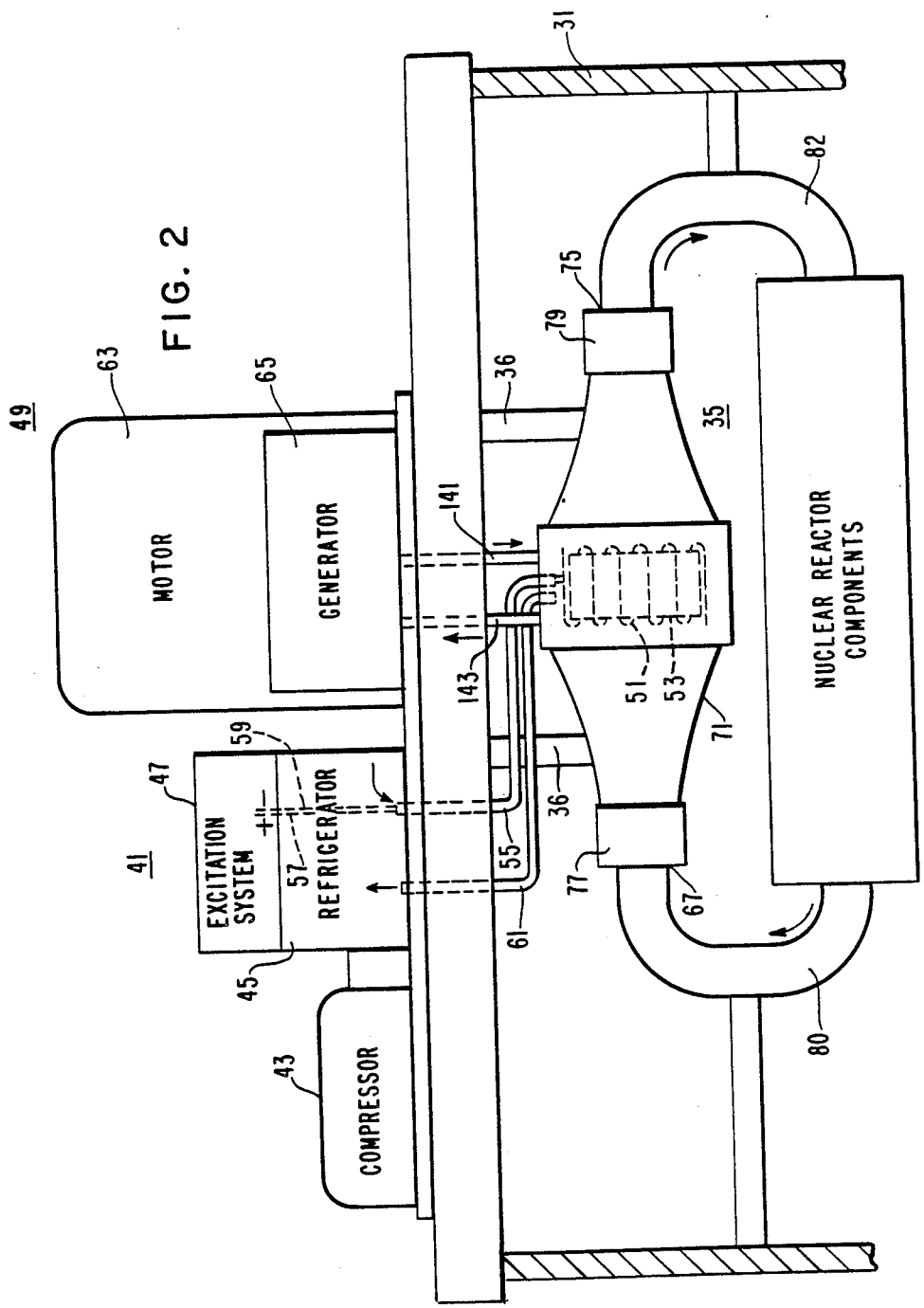
FIG. 2 is a diagrammatic view showing a DC electromagnetic pump assembly in accordance with this invention.

FIGS. 1 and 2 show the manner in which the liquid metal is circulated through the core 33. Typically, a suction head of about 450 to 500 feet of liquid sodium is developed at the pump to drive the metal through the core 33. The output of sodium from the core is supplied to the input 67 of the pump 35 through intermediate heat exchanger 37.

The electromagnetic pump 35 (FIGS. 2, 3, 4) according to this invention includes a plurality of ducts 71 and the toroidal electromagnet 53. The liquid metal is circulated through the ducts 71 to and from the reactor core 33. Typically there may be eight ducts, each circulating 15,000 gallons of liquid sodium per minute.

The walls of each duct 71 are linear over a portion 73 of their length between the inlet 67 and the outlet 75. Each duct flares inwardly from its linear portion to the inlet and outlet. At the inlet 67 and outlet 75 the ducts are secured by metal bands 77 and 79. At the inlet 67 and the outlet 75, the ducts are connected to tubes 80 and 82. Tube 80 is the cold leg of the coolant circuit and tube 82 is the hot leg.

Figure 4:
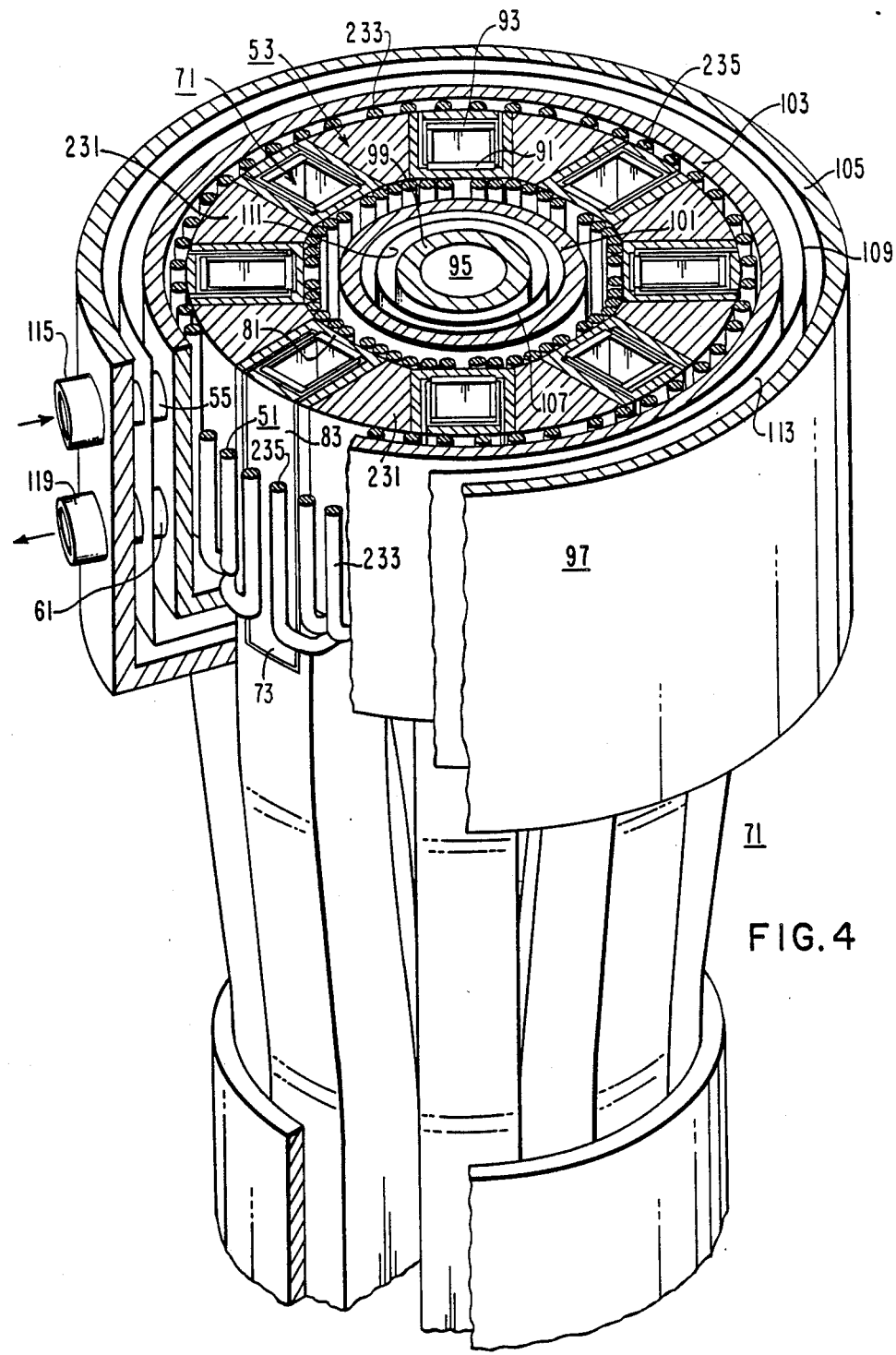
FIG. 4 is an isometric view of this pump, with the upper port in transverse section taken along line IV—IV of FIG. 3 and with parts broken away, showing the active region of a pump according to this invention.

The ducts are arranged throughout in an annular array so that in any imaginary plane, cutting the ducts transversely, the sections through their innermost outer surfaces 81 are tangent to an inner imaginary circle whose center is on the axis of the annulus and the corners of the sections through their outermost outer surfaces 83 define an outer imaginary circle concentric with the inner circle (FIG. 4). Arrays of other forms are also feasible.

The electromagnetic driving force is applied to the liquid metal in the linear portion 73 of the duct array. This portion includes duct sections having electrodes 91 and 93 (FIG. 4,6) for impressing potential to drive current radially through the ducts.

Figure 10:
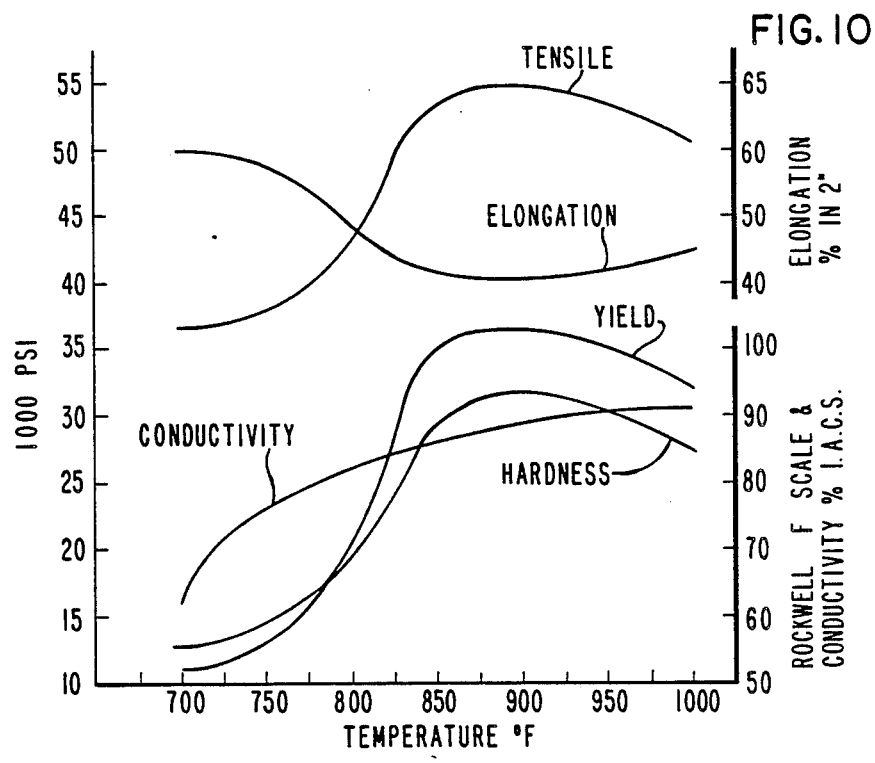
FIG. 10 is a graph showing the strength, ductility, and electrical properties of the copper (PD135) which is used for the electrodes and for the metal of the ducts through which the liquid metal flows.
Figure 9:
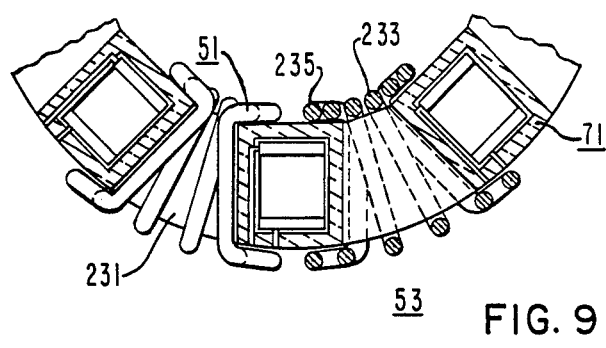
FIG. 9 is a fragmental view in transverse section taken along line IX—IX of FIG. 8.
Figure 8:
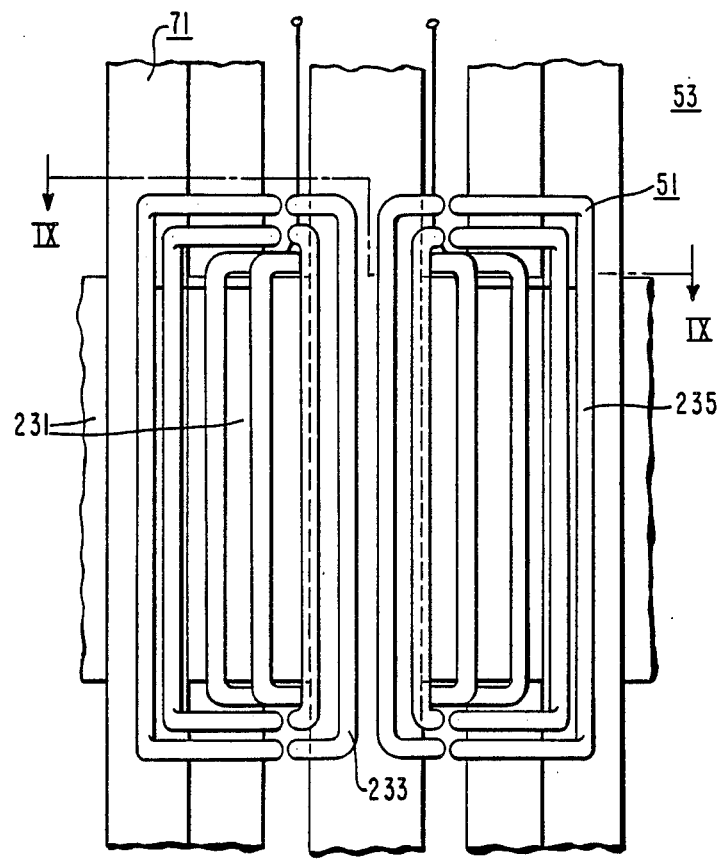
FIG. 8 is a fragmental view in side elevation showing the saddle-back windings of the electromagnet of a pump according to this invention.

Typically the electrodes 91 and 93 are composed of PD135 or PD135FM heat treatable copper alloys. FIG. 10 shows the strength, ductility and electrical conductivity properties of these alloys as a function of temperature. Temperature is plotted horizontally in F°. Stress is plotted vertically in thousands of pounds per square inch on the left. Rockwell F hardness and conductivity in percent IACR are plotted vertically on the lower right and elongation in percent in a 2-inch specimen is plotted vertically along the upper right. The specimen for which the graphs were derived was a 2-inch long rod having a diameter of 0.610 inch, solution treated for one hour at 1750° F. The temperature of liquid sodium is between 700° F. and 1000° F. and in this range the properties of the PD135 and PD135FM alloys are advantageous. The alloy may be procured from Phelps Dodge Copper Products Corporation of 300 Park Ave., New York, N.Y. 10022. Information on this alloy is presented in Phelps Dodge leaflet entitled PD-135 and PD-135-FM "Super Copper" M5693.

The linear portion 73 is enclosed internally and externally in Dewars 95 and 97 (FIG. 4). The internal Dewar 95 includes internal and external shells 99 and 101 defining between them an evacuated region. The external Dewar includes internal and external shells 103 and 105 defining between them an evacuated region. The shells may be composed of a metal such as stainless steel having low thermal conductivity. Between each pair of shells, a radiation shield 107 and 109 is disposed. The shields 107 and 109 may be composed of thin sheet metal and their surfaces 111 and 113 facing the higher temperature regions are preferably processed to be highly reflective of radiation. Typically the shields 107 and 109 are disposed radially centrally in the annuli defined by the shells 99 and 101 and 103 and 105. The coaxial conductor 55 is encircled by a tube 115 which is joined gas tight to the outer shell 105 by welding. The joint (not shown) of the tube 115 and the cable 55 is sealed gas tight. The space within the tube 115 is connected to the outer Dewars (103 and 105) and is evacuated. The cable 55 passes through the outer Dewar (FIG. 11) into the region 117 of the electromagnet 53. The tube 61 which conducts the resulting helium gas out of the region of the winding 51 is also encircled by a tube 119 which is welded gas tight to the outer shell 105. The joint (not shown) between tube 119 and tube 61 is sealed gas tight and the space within the tube 119 is evacuated to the same low pressure as the Dewar. The tube 61 passes through the outer Dewar and opens in the region 117.

The inner electrode 91 and the outer electrode 93 through which current flows through the liquid metal are joined by composite walls 121 (FIG. 6) which are insulated from the electrodes so that they offer high electrical resistance to the passage of current. The walls 121 together with the electrodes bound the rectangular channels through which the liquid metal flows in the region where the electromagnetic drive is impressed on the liquid metal. Each composite wall 121 includes a backing plate 123 of metal, typically stainless steel, and a plate 125 of low conductivity material such as HASTALLOY or INCONAL alloys. The plate 125 is relatively thin, typically about 0.060 inch. The backing plate 123 is connected on each side of the duct to the inner electrode 91 through a rod 127 of insulating material. Adjacent the outer electrode 93, the plate 123 on each side abuts the outer end of the flange 129 of a U-shaped insulator 131 which engages the outer surface at the electrode 93. The composite wall 121 is strengthened against the high pressure of the liquid metal which flows through ducts 71 by insulating blocks 133. Each block 133 has a stem 135 by means of which it is engaged by the wall 123. The composite side walls, while strong enough to withstand the pressure of the liquid metal, are of low electrical conductivity and minimize shunted current which should flow through the liquid metal.

Current is supplied to the liquid metal through electrodes 91 and 93 from conductors 141 and 143 (FIGS. 2, 3, 6, 14). Conductor 141 extends along the composite wall 121 and is connected to the innermost electrode 91. Conductor 143 is connected to the outermost electrode 93. Both conductors 141 and 143 emerge from the outer surface of each duct 71. Electrode 141 is provided with a sheath 145 of insulation along its length within the walls of each duct 71. The current through conductor 141 flows oppositely to the current through the liquid metal in the duct. The magnetic fields produced by these currents counteract each other and their distorting effect on the field produced by the electromagnet 53 is suppressed.

Figure 3:
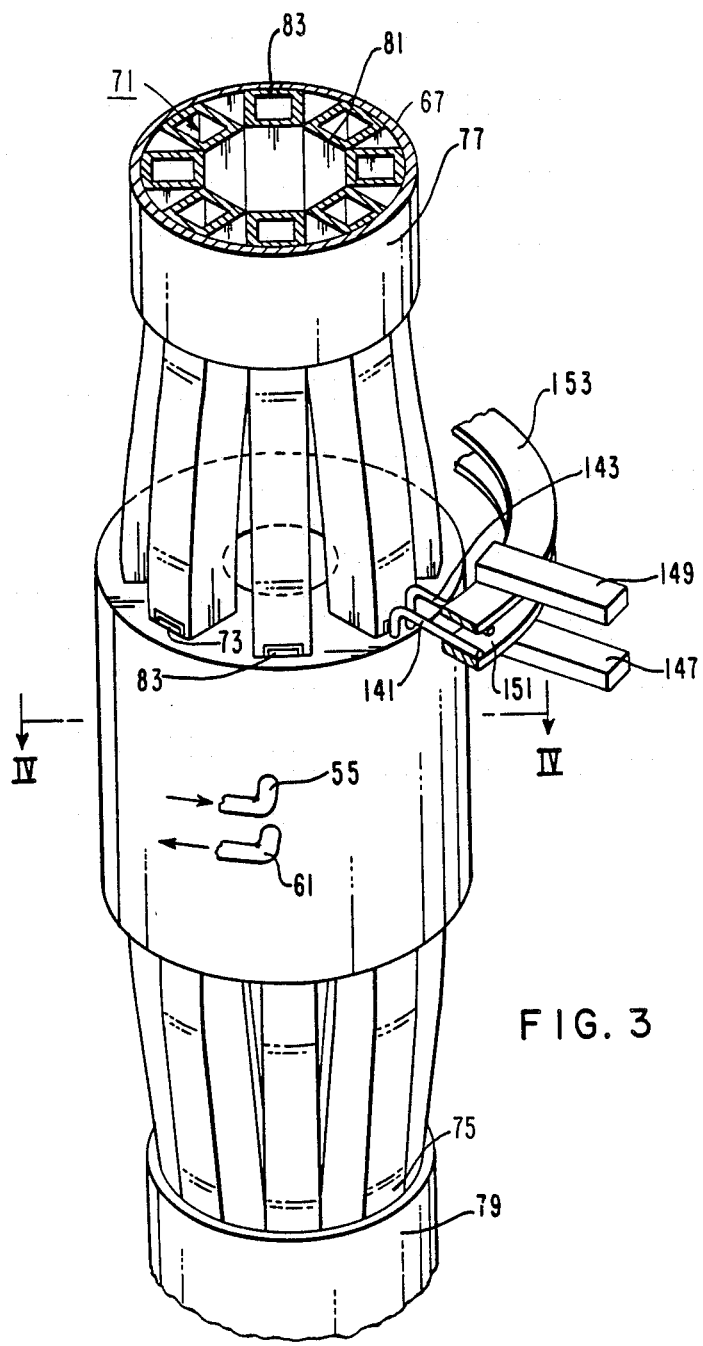
FIG. 3 is a view in isometric showing a DC electromagnetic pump in accordance with this invention.
Figure 14:
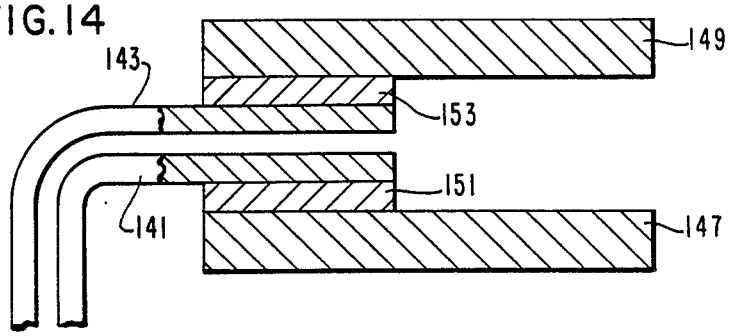
FIG. 14 is a fragmental view in section showing the manner in which current is supplied to the liquid which is pumped.

Conductors 141 and 143 are supplied from generator 65 (FIG. 15) through bus bars 147 and 149 (FIGS. 3 and 14). The bus bars are connected to rings 151 and 153 and the conductors 141 and 143 for each duct 71 supplied through the rings 151 and 153.

Figure 7:
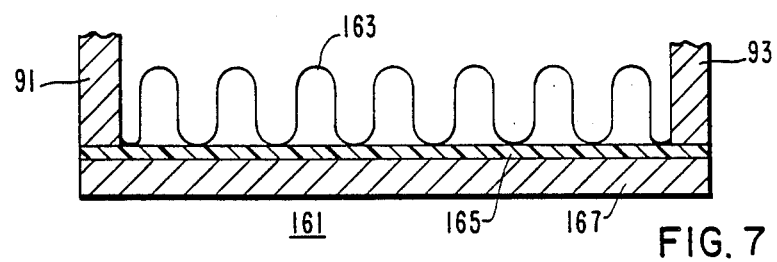
FIG. 7 is a fragmental view in transverse section showing an alternative structure of the wall section of high electrical resistance of a duct of a pump according to this invention.

The alternative duct shown in FIG. 7 includes composite side walls 161. The inner wall section 163 of side walls 161 is a thin folded strip of metal having high strength and relatively low electrical conductivity. Typically the strip is composed of stainless steel, or INCONEL or HASTELLOY alloy and has a thickness of about 0.060 inch. The strip 163 is secured at its ends to the electrodes 91 and 93. The strip is backed up by an insulating plate 165 and a metal plate 167, typically of mild steel, insulated from the electrodes by insulating plate 165.

Figure 5:
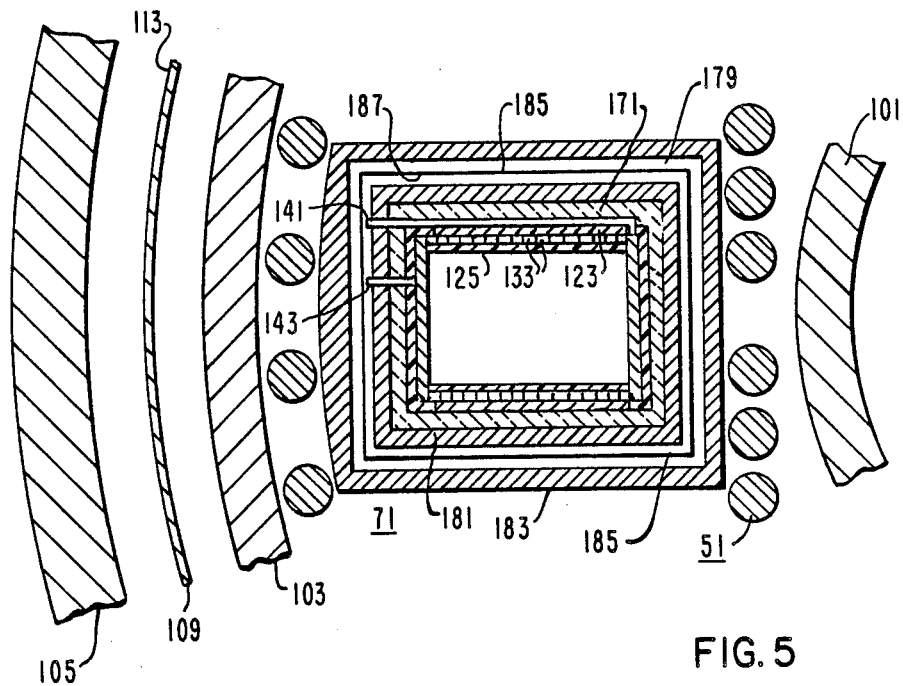
FIG. 5 is a fragmental view of a portion of the section of FIG. 4 enlarged showing the structure of a duct of a pump, according to this invention, and the adjacent parts.
Figure 6:
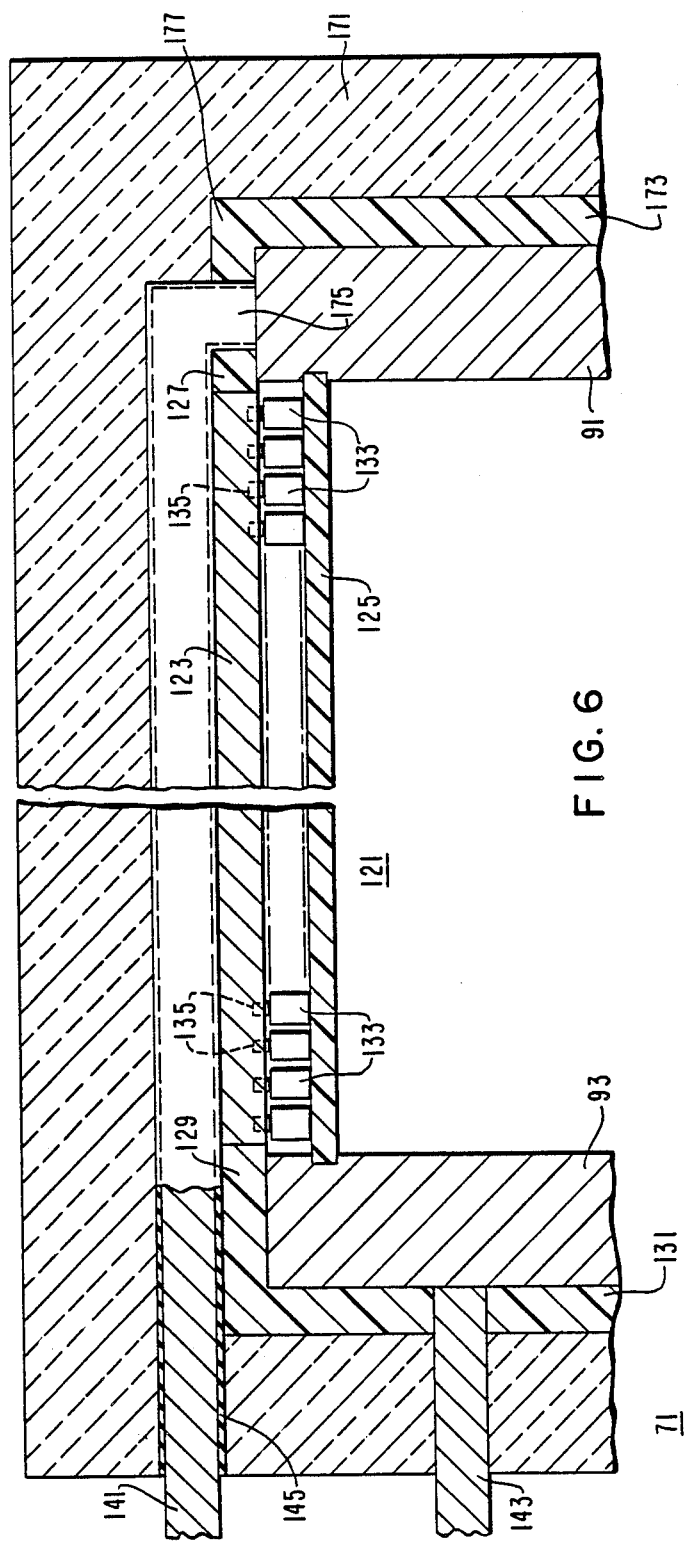
FIG. 6 is a fragmental view in transverse section showing the structure of the wall section of high electrical resistance of a duct of a pump according to this invention.

The above-described inner structure of the duct 71, is enclosed, in the region where the driving force is impressed, in an electricallyand thermally insulating frame 171 (FIGS. 5, 6). Inwardly the frame 171 abuts a channel 173 (FIG. 6) of electrically insulating material. The electrode 141 has an elbow 175 whose end is connected to the electrode 91. This elbow is engaged on the inner side by the end of the flange 177 of the channel 173 and on the outer side by rod 127. The frame 171 is penetrated on its outer side by the electrodes 141 and 143.

The insulating frame is enclosed in a Dewar 179 (FIG. 5) including an inner shell 181, an outer shell 183 and a radiation shield 185. The shells 181 and 183 and the shield 185 are rectangular. The surface 187 of the shield inwardly is processed so that it is highly radiation reflective. The Dewar 179 extends along the length of the region where the driving force is impressed on the liquid metal.

The homopolar generator 65, (FIG. 15), which supplies the current to the liquid metal, includes a frame 191 composed of outer members 193 and 195 and inner members 197 and 199. The inner members 197 and 199 abut each other and the adjacent outer members 193 and 195. Each of the outer members 193 and 195 is circularly annular and has flanges 201. Each of the inner members 197 and 199 is also circularly annular and has a lip 203. The members 193-199 are each composed of magnetizable material, for example soft iron or steel. The generator 65 has a rotor 205. The rotor is composed of a magnetizable material such as steel. It is lined externally by a shell 207 of highly conducting material such as copper or aluminum. The shell 207 may be between 0.100 and 1.000 inch thick. The shaft 209 of the rotor 205 is journaled in bearings 211 and 213 which are seated in shouldered openings in the outer members 193 and 195 of the frame 191. The shaft 209 is driven by motor 63. The generator 65 has field coils 215 and 217. The coils 215 and 217 are seated in the annular slots defined by the lips 203 of the inner members 197 and 199. At one region there is an air gap between the members 197 and 199 through which the conductors 219 and 221, which supply the coils 215 and 217, are admitted. The generator 65 has a plurality of circumferentially disposed brushes 223 and 225 which engage the shell 207. The brushes are seated in the annular slots defined by the flanges 201. The collective current from the brushes is supplied to the buses 147 and 149 (FIG. 3). The brushes 223 are connected to the bus 147 and the brushes 225 to the bus 149.

The electromagnet 53 (FIGS. 4, 8, 9) includes in addition to the winding 51 core members or blocks 231 of magnetic or magnetizable material. The core members 231 extend along the length of the region where the driving force is impressed on the liquid metal and have a cross section of the shape of a section of an annulus. The core members 231 are interposed between the ducts 71. The winding 51 is the saddle-back type. It includes turns 233 which extend along and over the core members 231 and turns 235 which extend along and over the ducts.

Figure 12:
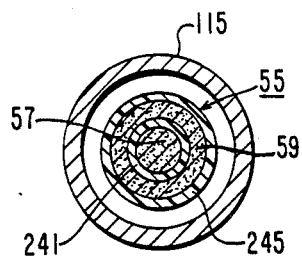
FIG. 12 is a view in transverse section taken along line XII—XII of FIG. 11.
Figure 13:
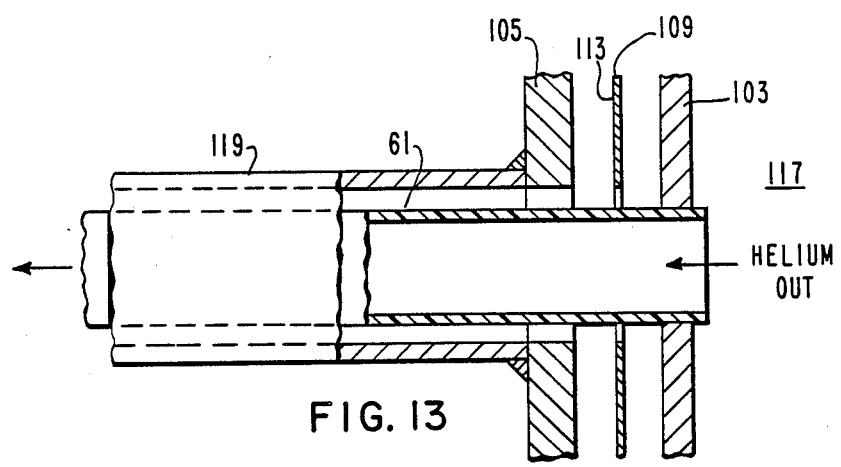
FIG. 13 is a fragmental view partly in side elevation and partly in section showing the conductor for removing the vaporized helium from the region of the windings of the electromagnet.
Figure 11:
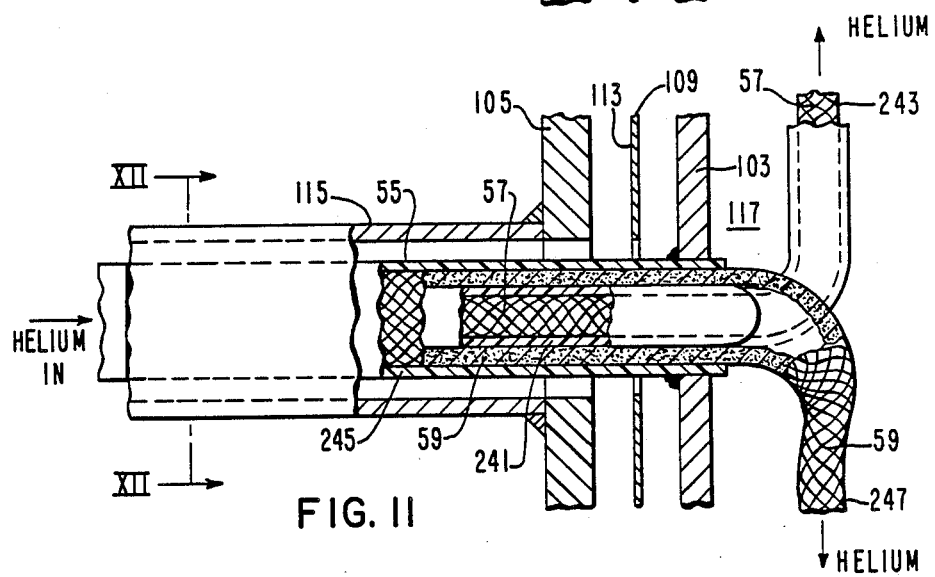
FIG. 11 is a fragmental view partly in side elevation and partly in longitudinal section showing the manner in which the windings of the electromagnet included in a pump in accordance with this invention are supplied with exciting current and are simultaneously cooled to superconductive temperature.

The winding 51 is supplied with excitation by the inner conductor 57 and the outer conductor 59 of the coaxial cable 55 (FIGS. 11, 12). The inner conductor 57 is a braided tube enclosed in an insulating sheath 241. Inwardly of the shell 103, the insulation is stripped so that along a portion 243 of its length to its connection of the winding 51 the conductor 57 constitutes an open tube. The outer conductor 59 is likewise a braided tube in an insulating sheath 245. Within the shell 103 the insulation 245 is stripped so that along a portion 247 of its length to its connection to the windings 51 the conductor 59 is an open tube. The liquid helium is fed into the coaxial cable 55 and flows into the space inwardly of shell 103 in which the windings 51 are disposed through the braided tubes 243 and 247.

The magnetic field of the electromagnet 53 is applied to the liquid metal within the ducts 71 in a circumferential direction perpendicular to the longitudinal axis of the ducts and to the radial current through the liquid metal. The current flows radially. The resulting electromagnetic force in the liquid metal is longitudinal of the ducts. The direction is set by properly setting the direction of the magnetic field.

While embodiments of this invention have been disclosed herein in detail, many modifications thereof are feasible. This invention is not to be restricted except insofar as is necessitated by the spirit of the prior art.

I claim:

1. An electromagnetic pump for transmitting an electrically conductive fluid including duct means for conducting said fluid, said duct means having a fluid inlet and a fluid outlet and having a plurality of separate ducts interposed between said inlet and outlet, said ducts extending circumferentially so that in transverse section the sections of said ducts define an annulus, each said duct having displaced electrodes in contact with said fluid, first power supply means connected to said electrodes for supplying current to said fluid through said electrodes, said electrodes being so disposed that said current is conducted generally radially with respect to said annulus through said fluid, a toroidal electromagnet, said toroidal electromagnet having a plurality of magnetizable cores interposed circumferentially between said ducts so that in transverse section, the sections of said core are interposed between the sections of said ducts in said annulus, said toroidal electromagnet also having winding means, and second power supply means connected to said winding means for supplying exciting current to said winding means to produce a magnetic field in said fluid, the windings of said winding means having turns extending over said cores and passing appreciably longitudinally along said ducts between said cores, so that said magnetic field is generally circumferential with respect to said annulus, the said turns extending appreciably longitudinally along said ducts suppressing magnetic flux leakage radially of said ducts.

2. An electromagnetic pump for transmitting an electrically conductive fluid including duct means for conducting said fluid longitudinally thereof, the internal walls of said duct means confining said fluid including spaced electrodes and wall sections joining said spaced electrodes, and fluid exerting a high pressure in said wall sections, power supply means connected to said electrodes for supplying current through said fluid, said current flowing through said fluid transversely of said duct means, said walls having the property of minimizing the flow of current in shunt to the current flowing through said fluid between said electrodes, electromagnetic means connected to said duct means for impressing a magnetic field on said fluid generally perpendicular to the direction of flow of said current and also generally perpendicular to the longitudinal dimension of said duct means along which said fluid is to be transmitted, and means, electrically insulated from said electrodes, connected to said wall sections as backing, to enable said wall sections to withstand said pressure.

3. The electromagnetic pump of claim 2 wherein the wall sections are composed of metal of small thickness, said metal having a low electrical conductivity and the backing is composed of a plurality of high temperature resistance insulators supported from a structure behind the walls, said insulators engaging said walls.

4. The electromagnetic pump of claim 2 wherein the wall sections are composed of metal of small thickness, the said metal being of low electrical conductivity, the wall sections being folded back and forth between the electrodes so that the electrically conductive paths of the walls are of substantial length.

5. Electromagnetic-pump apparatus for driving an electrically conductive fluid, said apparatus including an electromagnetic pump having a toroidal electromagnet having a plurality of spaced core members and a unitary duct for conducting said fluid interposed between each pair of core members, each said duct having displaced electrodes to contact said fluid electrically, a fluid circuit through which said electromagnetic pump circulates said fluid, said circuit including, a fluid-outlet conductor, connected in common to all said ducts, for conducting said fluid from said pump through said circuit and also including a fluidinlet conductor, connected in common to all said ducts, for conducting said fluid from said circuit to said pump, first powersupply means connected to said electrodes for supplying direct current through said fluid in each said duct predominantly in a radial direction with respect to said toroidal electromagnet, said toroidal electromagnet being positioned with respect to said ducts to impress a magnetic field on said fluid, said field having a substantial component circumferential with respect to said toroidal electromagnet, the core members of said electromagnet having exciting winding means, said winding means having turns composed of a material which is superconductive at low temperatures, a sealed enclosure enclosing said electromagnet and the portion of the ducts connected to said electromagnet, means, connected to said enclosure and to said winding means, for circulating liquid helium through said winding means for maintaining said winding means in liquid helium at a temperature at which said winding means are superconductive, and second power-supply means for supplying exciting current to said winding means.

6. Electromagnetic-pump apparatus for driving an electrically conductive fluid, said apparatus including an electromagnetic pump having a toroidal electromagnet having a plurality of spaced core members and a unitary duct for conducting said fluid interposed between each pair of core members, each said duct having spaced electrodes to contact said fluid electrically, said electrodes in each said duct being oppositely disposed wall sections of each said duct, a fluid circuit through which said electromagnetic pump circulates said fluid, said circuit including, a fluid-outlet conductor, connected in common to all said ducts, for conducting said fluid from said pump through said circuit and also including a fluid-inlet conductor, connected in common to all said ducts, for conducting said fluid from said circuit to said pump, first power-supply means having a first conductor and a second return conductor connected to said spaced electrodes for supplying direct current through said fluid in each said duct predominantly in a radial direction with respect to said toroidal electromagnet, said first power-supply means being connected through said first conductor to those of said spaced electrodes which are electrically nearest said first power-supply means and through said second return conductor to those of said spaced electrodes which are electrically remote from said first power-supply means, said second return conductor extending generally parallel and adjacent said each duct so that the currents flowing through said fluid and away from said fluid are in parallel adjacent oppositely conducting paths, said toroidal electromagnet being positioned with respect to said ducts to impress a magnetic field on said fluid, said field having a substantial component circumferential with respect to said toroidal electromagnet, the core members of said electromagnet having exciting winding means, said winding means having turns composed of a material which is superconductive at low temperatures, means, connected to said winding means for maintaining said winding means at a temperature at which said winding means are superconductive, and second power-supply means for supplying exciting current to said winding means.

7. Electromagnetic-pump apparatus for driving an electrically conductive fluid, said apparatus including an electromagnetic pump having a toroidal electromagnet having a plurality of spaced core members and a unitary duct for conducting said fluid interposed between each pair of core members, each said duct having displaced electrodes to contact said fluid electrically, a fluid circuit through which said electromagnetic-pump apparatus circulates said fluid, said circuit including, a fluid-outlet conductor, connected in common to all said ducts, for conducting said fluid from said pump through said circuit and also including a fluid-inlet conductor, connected in common to all said ducts, for conducting said fluid from said circuit to said pump, first power-supply means, connected to said electrodes, for supplying direct current through said fluid in each said duct predominantly in a radial direction with respect to said toroidal electromagnet, said toroidal electromagnet being positioned with respect to said ducts to impress a magnetic field on said fluid, said field having a substantial component circumferential with respect to said toroidal electromagnet, the core members of said electromagnet having exciting winding means, said winding means having turns composed of a material which is superconductive at low temperatures, means, connected to said winding means, for maintaining said winding means at a temperature at which said winding means are superconductive, second power-supply means including conductors connected to said winding means, said conductors conducting current to said winding means for supplying exciting current to said winding means, and means, connected to said conductors, for conducting liquid helium to said winding means for maintaining said winding means at superconductive temperatures.

8. The electromagnetic-pump apparatus of claim 7 wherein the conductors are braided, the braid being exposed in the region of the winding means so that helium may flow in said region through the braids.

9. Electromagnetic-pump apparatus for driving an electrically conductive fluid, said apparatus including an electromagnetic pump having a toroidal electromagnet having a plurality of spaced core members and a unitary duct for conducting said fluid interposed between each pair of core members, each said duct having displaced electrodes to contact said fluid electrically, a first Dewar enclosing said toroidal electromagnet and said ducts internally, a second Dewar enclosing said toroidal electromagnet and said ducts externally, and a third Dewar for enclosing each said duct, a fluid circuit through which said electromagneticpump apparatus circulates said fluid, said circuit including, a fluid-outlet conductor, connected in common to all said ducts, for conducting said fluid from said pump through said circuit and also including a fluid-inlet conductor, connected in common to all said ducts, for conducting said fluid from said circuit to said pump, first power-supply means, connected to said electrodes, for supplying direct current through said fluid in each said duct predominantly in a radial direction with respect to said toroidal electromagnet, said toroidal electromagnet being positioned with respect to said ducts to impress a magnetic field on said fluid, said field having a substantial component circumferential with respect to said toroidal electromagnet, the core members of said electromagnet having exciting winding means, said winding means having turns composed of a material which is superconductive at low temperatures, means, connected to said winding means, for maintaining said winding means at a temperature at which said winding means are superconductive, and second power-supply means for supplying exciting current to said winding means.

10. Electromagnetic-pump apparatus for driving an electrically conductive fluid, said apparatus including an electromagnetic pump having a toroidal electromagnet having a plurality of spaced core members and a unitary duct for conducting said fluid interposed between each pair of core members, each said duct having displaced electrodes to contact said fluid electrically, a fluid circuit through which said electromagnetic-pump apparatus circulates said fluid, said circuit including, a fluid-outlet conductor, connected in common to all said ducts, for conducting said fluid from said pump through said circuit and also including a fluid-inlet conductor, connected in common to all said ducts, for conducting said fluid from said circuit to said pump, first power-supply means connected to said electrodes for supplying direct current through said fluid in each said duct predominantly in a radial direction with respect to said toroidal electromagnet, said toroidal electromagnet being positioned with respect to said ducts to impress a magnetic field on said fluid, said field having a substantial component circumferential with respect to said toroidal electromagnet, the core members of said electromagnet having exciting winding means, said winding means having turns composed of a material which is superconductive at low temperatures, means, connected to said winding means, for maintaining said winding means at a temperature at which said winding means are superconductive, second power-supply means having hollow conductors for supplying exciting current to said winding means, and means, connected to said hollow conductors, for supplying liquid helium through said hollow conductors to maintain said exciting windings at superconductive temperatures.

11. The electromagnetic-pump apparatus of claim 10 wherein the hollow conductors are enclosed in an evacuated shell.

12. The electromagnetic-pump apparatus of claim 10 wherein each hollow conductor is a braided tube enclosed in an insulating sheath and the insulation is stripped away along a portion of the length of each conductor to its connection to the winding means so that each supply conductor is, along its stripped-away portion, an open tube.

13. Electromagnetic-pump apparatus for driving an electrically conductive fluid, said apparatus including an electromagnetic pump having a toroidal electromagnet having a plurality of spaced core members and a unitary duct for conducting said fluid interposed between each pair of core members, each said duct having displaced electrodes to contact said fluid electrically, a Dewar including an evacuated annulus bounded by an outer shell and an inner shell enclosing said toroidal electromagnet and said ducts externally, a fluid circuit through which said electromagnetic pump circulates said fluid, said circuit including, a fluid-outlet conductor, connected in common to all said ducts, for conducting said fluid from said pump through said circuit and also including a fluid-inlet conductor, connected in common to all said ducts, for conducting said fluid from said circuit to said pump, first power-supply means connected to said electrodes for supplying direct current through said fluid in each said duct predominantly in a radial direction with respect to said toroidal electromagnet, said toroidal electromagnet being positioned with respect to said ducts to impress a magnetic field on said fluid, said field having a substantial component circumferential with respect to said toroidal electromagnet, the core members of said electromagnet having exciting winding means, said winding means having turns composed of a material which is superconductive at low temperatures, means, connected to said winding means, for maintaining said winding means at a temperature at which said winding means are superconductive, second power-supply means including a cable having hollow supply conductors for supplying exiciting current to said winding means through said cable, an evacuated tube sealed gas-tight to said outer shell and to said cable, and means, connected to said hollow supply conductors, for supplying liquid helium to said winding means to maintain said winding means at said superconductive temperatures.

14. The electromagnetic-pump apparatus of claim 13 wherein each hollow conductor is a braided tube enclosed in an insulating sheath and the insulation is stripped away along a portion of the length of each conductor to its connection to the winding means so that each supply conductor is, along the stripped-away portion, an open tube.

* * * * *